US010283858B2

(12) United States Patent
Xue et al.

(10) Patent No.: US 10,283,858 B2
(45) Date of Patent: May 7, 2019

(54) ANTENNA FOR TERMINAL

(71) Applicant: Beijing Xiaomi Mobile Software Co., Ltd., Beijing (CN)

(72) Inventors: Zonglin Xue, Beijing (CN); Linchuan Wang, Beijing (CN); Xiaofeng Xiong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 37 days.

(21) Appl. No.: 15/473,211

(22) Filed: Mar. 29, 2017

(65) Prior Publication Data

US 2017/0294709 A1 Oct. 12, 2017

(30) Foreign Application Priority Data

Apr. 8, 2016 (CN) .......................... 2016 1 0214832

(51) Int. Cl.
*H01Q 1/24* (2006.01)
*H01Q 1/48* (2006.01)
(Continued)

(52) U.S. Cl.
CPC ............... *H01Q 1/48* (2013.01); *H01Q 1/243* (2013.01); *H01Q 1/38* (2013.01); *H01Q 5/328* (2015.01);
(Continued)

(58) Field of Classification Search
CPC ...... H01Q 1/243; H01Q 13/10; H01Q 9/0421; H01Q 9/42; H01Q 5/307; H01Q 13/106; H01Q 21/29; H01Q 5/00; H01Q 5/321
(Continued)

(56) References Cited

U.S. PATENT DOCUMENTS 9,203,141 B1 12/2015 Su et al.
2007/0285321 A1* 12/2007 Chung .................... H01Q 1/38
343/702

(Continued)

FOREIGN PATENT DOCUMENTS

CN 103236583 A 8/2013
CN 103326124 A 9/2013

(Continued)

OTHER PUBLICATIONS

Supplementary European Search Report in European application No. 17165010.4, dated Aug. 22, 2017, 9 pages.

(Continued)

*Primary Examiner* — Linh V Nguyen
(74) *Attorney, Agent, or Firm* — Arch & Lake LLP

(57) ABSTRACT

An antenna for a terminal includes: a metal frame surrounding four sides of the terminal, a circuit board positioned within the metal frame and at least two radiation units arranged on the circuit board. The metal frame includes a bottom frame and a side frame defined by two breaking joints disposed on a side of the metal frame. A signal feed point is arranged on the circuit board, the signal feed point is connected with the bottom frame through a first radiation unit. At least two first grounding points are also arranged on the circuit board, the at least two first grounding points are positioned on one side of the signal feed point, the at least two first grounding points are connected with the bottom frame through a second radiation unit, and the bottom frame is configured to generate low-frequency resonance.

18 Claims, 2 Drawing Sheets

(51) Int. Cl.

| | |
|---|---|
| ***H01Q 5/385*** | (2015.01) |
| ***H01Q 1/38*** | (2006.01) |
| ***H01Q 9/42*** | (2006.01) |
| ***H01Q 5/328*** | (2015.01) |
| ***H01Q 5/364*** | (2015.01) |

(52) U.S. Cl.
CPC ............. *H01Q 5/364* (2015.01); *H01Q 5/385* (2015.01); *H01Q 9/42* (2013.01)

(58) Field of Classification Search
USPC .................. 343/702, 700 MS, 876, 728, 725
See application file for complete search history.

(56) References Cited

U.S. PATENT DOCUMENTS

| | | | | |
|---|---|---|---|---|
| 2009/0128426 | A1* | 5/2009 | Wang | H01Q 1/243 343/702 |
| 2013/0135157 | A1* | 5/2013 | Tsou | H01Q 1/2266 343/702 |
| 2013/0176178 | A1 | 7/2013 | Chen | |
| 2014/0078008 | A1 | 3/2014 | Kang | |
| 2015/0009074 | A1* | 1/2015 | Hsieh | H01Q 9/0421 343/700 MS |
| 2015/0123871 | A1* | 5/2015 | Chang | H01Q 1/243 343/872 |
| 2015/0364812 | A1 | 12/2015 | Su et al. | |
| 2016/0344439 | A1* | 11/2016 | Seol | H01Q 1/243 |
| 2017/0033440 | A1* | 2/2017 | Kim | H01Q 1/243 |
| 2017/0054200 | A1 | 2/2017 | Kang et al. | |
| 2017/0142241 | A1* | 5/2017 | Kim | H04M 1/026 |
| 2017/0162933 | A1* | 6/2017 | Xiong | H01Q 1/243 |
| 2017/0244818 | A1* | 8/2017 | Kim | H04M 1/026 |
| 2018/0083343 | A1* | 3/2018 | Choon | H01Q 1/243 |
| 2018/0090821 | A1* | 3/2018 | Lee | H01Q 9/42 |

FOREIGN PATENT DOCUMENTS

| | | | |
|---|---|---|---|
| CN | 203895602 | U | 10/2014 |
| CN | 204189957 | U | 3/2015 |
| CN | 104852122 | A | 8/2015 |
| CN | 204966695 | U | 1/2016 |
| CN | 105305067 | A | 2/2016 |

OTHER PUBLICATIONS

International Search Report in international application No. PCT/CN2016/093897, dated Dec. 28, 2016, 2 pages.

International Search Report in international application No. PCT/CN2016/093897, dated Dec. 28, 2016, 4 pages.

Written Opinion of the International Search Authority in international application No. PCT/CN2016/093897, dated Dec. 28, 2016, 4 pages.

Chinese Office Action (including English translation) issued in CN Patent App. No. 201610214832.2, dated Mar. 5, 2019, 23 pages.

* cited by examiner

ANTENNA FOR TERMINAL

CROSS-REFERENCE TO RELATED APPLICATION

This application is based upon and claims priority to Chinese Patent Application No. 201610214832.2, filed on Apr. 8, 2016, the entire contents of which are incorporated herein by reference.

TECHNICAL FIELD

The present disclosure generally relates to the field of antenna technology applications, and more particularly, to an antenna for a terminal.

BACKGROUND

An antenna is a device configured to receive and send signals in a terminal, and designing an antenna in a terminal needs to avoid electronic components in the terminal to avoid interference to signals of the antenna. In a related technology, more and more terminals start are provided with metal frames and even metal back shells to improve aesthetics of the terminals, but adopting a metal frame for a terminal may greatly influence performance of an antenna.

SUMMARY

According to an aspect of the disclosure, there is provided an antenna. The antenna may include: a metal frame, a circuit board positioned within the metal frame and at least two radiation units arranged on the circuit board. Here, two breaking joints may be disposed on a side of the metal frame. The two breaking joints may divide the metal frame into a bottom frame and a side frame. A signal feed point may be arranged on the circuit board, and the signal feed point may be connected with the bottom frame through a first radiation unit. At least two first grounding points may also be arranged on the circuit board, the at least two first grounding points may be positioned on one side of the signal feed point, the at least two first grounding points may be connected with the bottom frame through a second radiation unit, and the bottom frame may be configured to generate low-frequency resonance.

According to a second aspect of the disclosure, there is provided a terminal. The terminal may include: an antenna including a metal frame surrounding the terminal, a circuit board positioned within the metal frame and at least two radiation units arranged on the circuit board. Here, two breaking joints may be disposed on a side of the metal frame. The two breaking joints may divide the metal frame into a bottom frame and a side frame. A signal feed point may be arranged on the circuit board, and the signal feed point may be connected with the bottom frame through a first radiation unit. At least two first grounding points may also be arranged on the circuit board, the at least two first grounding points may be positioned on one side of the signal feed point, the at least two first grounding points may be connected with the bottom frame through a second radiation unit, and the bottom frame may be configured to generate low-frequency resonance.

It is to be understood that both the foregoing general description and the following detailed description are exemplary and explanatory only and are not restrictive of the invention, as claimed.

BRIEF DESCRIPTION OF THE DRAWINGS

In order to describe embodiments of the present disclosure more clearly, the accompanying required by descriptions about the embodiments will be simply introduced below. Obviously, the accompanying drawings described below are only some embodiments of the present disclosure, and those skilled in the art may further obtain other accompanying drawings according to these accompanying drawings on the premise of no creative work.

Figure 1:
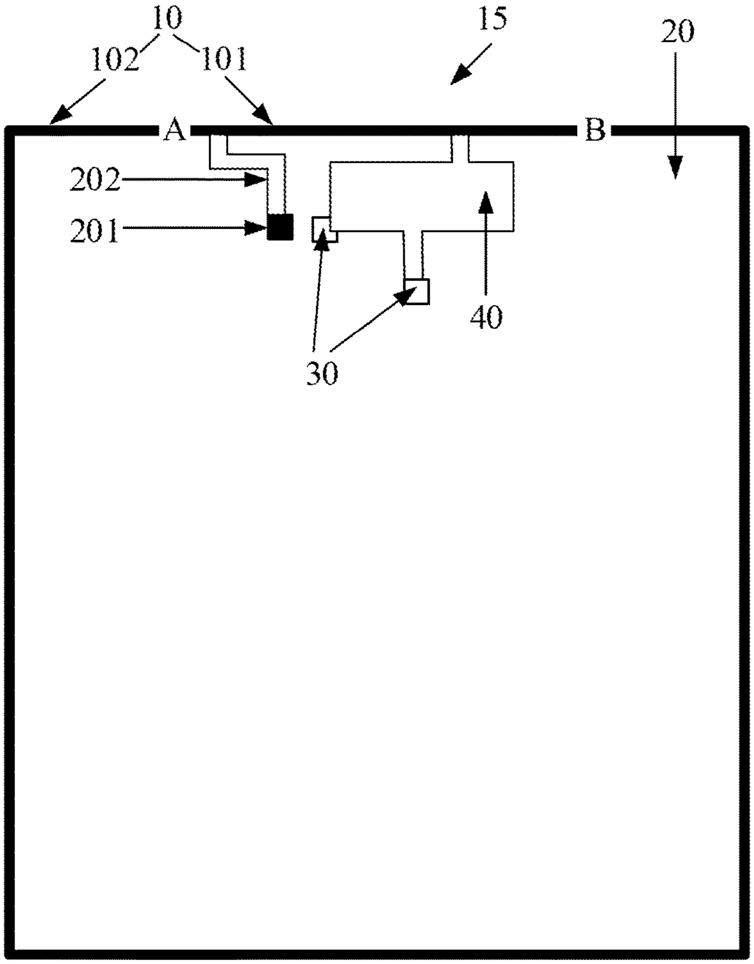
FIG. 1 is a structure diagram of an antenna for a terminal, according to an exemplary embodiment.

The accompanying drawings, which are incorporated in and constitute a part of this specification, illustrate embodiments consistent with the present disclosure and, together with the specification, serve to explain the principles of the present disclosure.

DETAILED DESCRIPTION

The terminology used in the present disclosure is for the purpose of describing exemplary embodiments only and is not intended to limit the present disclosure. As used in the present disclosure and the appended claims, the singular forms “a,” “an” and “the” are intended to include the plural forms as well, unless the context clearly indicates otherwise. It shall also be understood that the terms “or” and “and/or” used herein are intended to signify and include any or all possible combinations of one or more of the associated listed items, unless the context clearly indicates otherwise.

It shall be understood that, although the terms “first,” “second,” “third,” etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term “if” may be understood to mean “when” or “upon” or “in response to” depending on the context.

Reference throughout this specification to “one embodiment,” “an embodiment,” “exemplary embodiment,” or the like in the singular or plural means that one or more particular features, structures, or characteristics described in connection with an embodiment is included in at least one embodiment of the present disclosure. Thus, the appearances of the phrases “in one embodiment” or “in an embodiment,” “in an exemplary embodiment,” or the like in the singular or plural in various places throughout this specification are not necessarily all referring to the same embodiment. Furthermore, the particular features, structures, or characteristics in one or more embodiments may be combined in any suitable manner.

In order to make the purpose, technical solution and advantages of the present disclosure clearer, the present disclosure will be further described below with reference to the accompanying drawings in detail, and obviously, the described embodiments are not all embodiments but only part of embodiments of the present disclosure. All other embodiments obtained by skilled in the art based on the embodiments in the present disclosure without creative work shall fall within the scope of protection of the present disclosure.

An antenna in a terminal usually adopts a Planar Inverted F-shaped Antenna (PIFA), an Inverted F-shaped Antenna (IFA), a loop antenna or the like; and for a terminal adopting a metal frame, the metal frame may usually function as an auxiliary radiation unit of an antenna in the terminal. For example, two breaking joints are formed in the metal frame at the bottom of the terminal to divide the metal frame of the terminal into a bottom frame and a side frame, and the bottom frame is connected with a signal feed point, thereby enabling the bottom frame to radiate or receive signals.

FIG. 1 is a structure diagram of an antenna for a terminal 15, according to an exemplary embodiment, and as shown in FIG. 1, the antenna includes: a metal frame 10, a circuit board 20 positioned within the metal frame and at least two radiation units arranged on the circuit board. The metal frame 10 may surround a periphery of the terminal 15. When the terminal has a rectangular shape, the metal frame 10 may surround four sides of the terminal 15. The radiation units may include circuitries configured to send and receive signals in the antenna. For example, the radiation units may include at least one of the following: a metal wire printed on an antenna stand, a resistor, a capacitor, an inductor, and other types of electronic components.

Two breaking joints A and B are disposed on a side of the metal frame 10. The two breaking joints A and B divide the metal frame 10 into a bottom frame 101 and a side frame 102. A signal feed point 201 is arranged on the circuit board 20, and the signal feed point 201 is connected with the bottom frame 101 through a first radiation unit 202. Here, the two braking joins A and B may be disposed along a side of shorter length of the terminal 15. The terminal 15 may be any electronic device including an antenna. For example, the terminal 15 may be a smart phone, a laptop, a media player, a tablet, etc.

At least two first grounding points 30 are also arranged on the circuit board 20, the at least two first grounding points 30 are positioned on one side of the signal feed point 201, the at least two first grounding points 30 are connected with the bottom frame 101 through a second radiation unit 40, and the bottom frame 101 is configured to generate low-frequency resonance.

In the antenna for a terminal according to the one or more embodiments of the disclosure, the signal feed point is arranged on the circuit board of the antenna, and the signal feed point is connected with the bottom frame through the first radiation unit; the at least two first grounding points are also arranged on the circuit board, the at least two first grounding points are positioned on one side of the signal feed point, the at least two first grounding points are connected with the bottom frame through the second radiation unit, and the bottom frame connected with the first radiation unit and the second radiation unit may generate the low-frequency resonance; and moreover. Because the second radiation unit is connected with the at least two first grounding points, ground wire impedance of the antenna may be reduced, current in the antenna may dispersively flow into a main grounding point in the circuit board through the at least two first grounding points, a frequency band of the low-frequency resonance of the antenna is further widened, and performance of the antenna in the frequency band of the low-frequency resonance is improved.

The two breaking joints A and B in the metal frame may be symmetrically disposed along a central line of the side with the shorter length of the metal frame in an optional embodiment to ensure stability of radiation performance of the antenna in the terminal and improve aesthetics of appearance of the terminal. The side with the shorter length may be in direct contact with the top or bottom side of the terminal.

The signal feed point 201 is connected with the bottom frame 101 through the first radiation unit 202 and the bottom frame 101 is further connected with the at least two first grounding points 30 through the second radiation unit 40, so that the bottom frame 101 and the first and second radiation units form an IFA in the present disclosure, the IFA is connected with the at least two first grounding points, the low-frequency resonance of 700 MHz to 960 MHz may be generated, and compared with a conventional antenna cable of generating low-frequency resonance of a frequency band of 800 MHz to 960 MHz, the antenna provided by the present disclosure effectively widens the frequency band of the low-frequency resonance.

Figure 2:
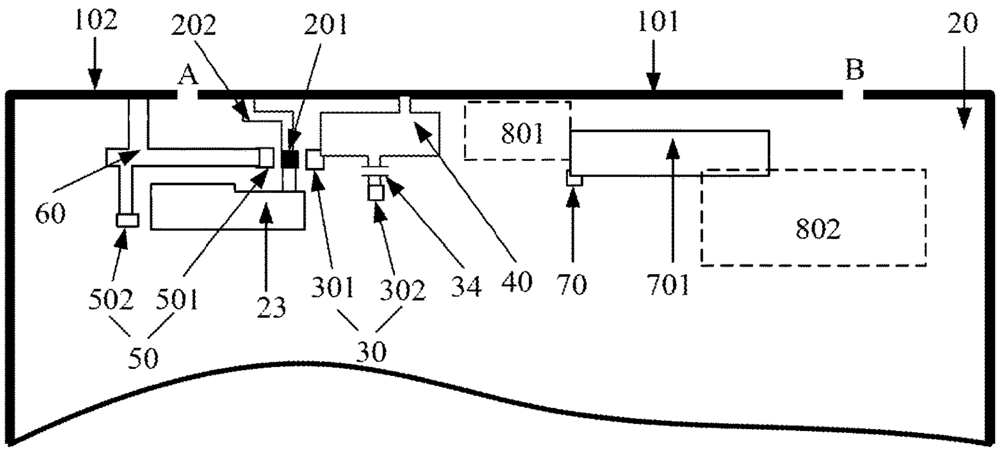
FIG. 2 is a structure diagram of another antenna for a terminal, according to an exemplary embodiment.

Optionally, as shown in FIG. 2, the antenna may further include: at least one frequency regulation electronic component 34 arranged on the circuit board 20. The electronic component 34 may be any one of a resistor, an inductor and a capacitor. The at least one frequency regulation electronic component 34 is connected in series between the at least two first grounding points 30 and the second radiation unit 40. An attribute parameter of the at least one frequency regulation electronic component 34 may be regulated (for example, a resistance magnitude of a resistor is regulated, an inductance magnitude of a inductor is regulated or a capacitance magnitude of a capacitor is regulated) to regulate impedance between the bottom frame 101 and the at least two first grounding points 30 to change the current between the bottom frame and the at least two first grounding points, namely to change an equivalent electrical length. Thus, the frequency regulation electronic component 34 may regulate the frequency band of the low-frequency resonance generated by the bottom frame 101, where the electrical length refers to a ratio of a physical length of the antenna to a ratio of propagation velocities of an electrical or electromagnetic signal in a free space and in the antenna, and resonance frequency is usually negatively correlated with the electrical length, that is, if the electrical length is greater, the resonance frequency is lower.

In the antenna of the embodiment shown in FIG. 2, a frequency regulation electronic component 34 is arranged on the circuit board 20, the frequency regulation electronic component 34 is a capacitor, the capacitor 34 is connected in series between a first grounding point 302 and the second radiation unit 40, and a capacitance magnitude of the capacitor may be regulated to regulate a magnitude of the current between the bottom frame 101 and the first grounding point 302 to further regulate the frequency band of the low-frequency resonance generated by the bottom frame, further improve the performance of the antenna in the frequency band of the low-frequency resonance and improve design flexibility of the antenna.

Furthermore, referring to FIG. 2, the antenna may further include: at least one second grounding point 50 arranged on the circuit board 20. Here, the at least one second grounding point 50 is positioned on the other side of the signal feed point 201, that is, the at least one second grounding point 50 and the at least two first grounding points 30 are positioned on the two sides of the signal feed point 201, respectively. The at least one second grounding point 50 is connected with the side frame 102 through a third radiation unit 60, the third radiation unit 60 is configured to generate intermediate-frequency resonance by coupling with the bottom frame

101, and a frequency band of the intermediate-frequency resonance may be 1,710 MHz to 2,170 MHz.

Optionally, as shown in FIG. 2, the antenna may further include: a first parasitic unit 23, the first parasitic unit 23 is connected with the side, far away from the bottom frame 101, of the signal feed point 201, and the first parasitic unit 23 is configured to generate high-frequency resonance. A frequency band of the high-frequency resonance which may be generated by the first parasitic unit 23 may be 2,300 MHz to 2,700 MHz, wherein the parasitic unit refers to an additional radiation unit configured to improve a resonance frequency band of the antenna in the antenna.

Furthermore, the antenna may include: at least one third grounding point 70 arranged on the circuit board 20. Here, the at least one third grounding point 70 is positioned on the side, far away from the signal feed point 201, of the at least two first grounding points 30, each third grounding point 70 is connected with a second parasitic unit 701, and the second parasitic unit 701 is configured to regulate the frequency band of the intermediate-frequency resonance. Exemplarily, the second parasitic unit 701 may be coupled with the components around (such as the bottom frame and the second radiation unit) to further regulate the performance of the antenna in the frequency band of the intermediate-frequency resonance.

Figure 3:
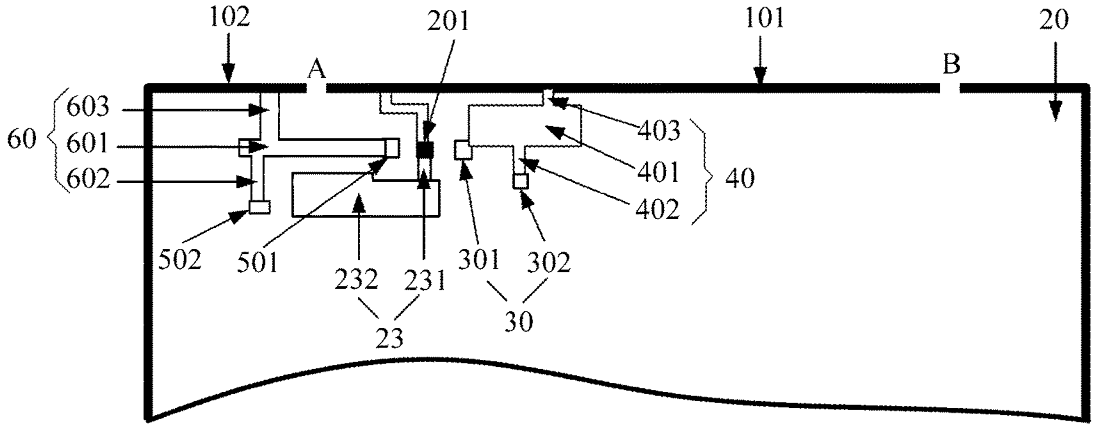
FIG. 3 is a structure diagram of a second radiation unit, according to an exemplary embodiment.

In the one or more embodiments of the present disclosure, referring to FIG. 2, two first grounding points 301 and 302 may be arranged on the circuit board 20. FIG. 3 is a structure diagram of a second radiation unit and a third radiation unit, according to one or more exemplary embodiments. As shown in FIG. 3, the second radiation unit 40 may include a first radiation part 401, a second radiation part 402 and a third radiation part 403, and each of the first to third radiation parts is of a strip-like structure;

one end of the first radiation part 401 is connected with the first grounding point 301 close to the signal feed point 201, the first radiation part 401 is positioned on the side, far away from the signal feed point 201, of the first grounding point 301, and a length direction of the first radiation part 401 is parallel to a length direction of the bottom frame 101;

one end of the second radiation part 402 is connected with the first grounding point 302 far away from the signal feed point 201, the other end of the second radiation part 402 is connected with the first radiation part 401, and a length direction of the second radiation part 402 is perpendicular to the length direction of the first radiation part 401; and one end of the third radiation part 403 is connected with the first radiation part 401, the other end of the third radiation part 403 is connected with the bottom frame 101, and a length direction of the third radiation part 403 is perpendicular to the length direction of the first radiation part 401. The first radiation part is arranged in parallel with the bottom frame, and the second and third radiation parts are arranged perpendicular to the first radiation part respectively, so that the area of the second radiation unit may be reduced as much as possible to further ensure that more electronic components may be arranged on the circuit board 20 on the basis of ensuring an effective connection between the two second grounding points and the side frame.

Alternatively or additionally, three first grounding points 30 may also be arranged on the circuit board 20 and the three first grounding points 30 may be connected with the bottom frame 101 through the second radiation unit 40 in another optional embodiment.

Furthermore, referring to FIG. 2, two second grounding points 501 and 502 may be arranged on the circuit board 20; and the second grounding point 501, close to the signal feed point 201, of the two second grounding points and the first grounding point 301 close to the signal feed point 201 are symmetrically arranged with the signal feed point 201 being a center point.

Alternatively or additionally, a second grounding point 501 may also be arranged on the circuit board 20 and the second grounding point 501 and the first grounding point 301 close to the signal feed point 201 are symmetrically arranged with the signal feed point 201 being the center point in another optional embodiment.

As shown in FIG. 3, the third radiation unit 60 may include a fourth radiation part 601, a fifth radiation part 602 and a sixth radiation part 603, and each of the fourth to sixth radiation parts is of a strip-like structure;

one end of the fourth radiation part 601 is connected with the second grounding point 501 close to the signal feed point 201, the fourth radiation part 601 is positioned on the side, far away from the signal feed point 201, of the second grounding point 501, and a length direction of the fourth radiation part 601 is parallel to the length direction of the bottom frame 101;

one end of the fifth radiation part 602 is connected with the second grounding point 502 far away from the signal feed point 201, the other end of the fifth radiation part 602 is connected with the fourth radiation part 601, and a length direction of the fifth radiation part 602 is perpendicular to the length direction of the fourth radiation part 601; and one end of the sixth radiation part 603 is connected with the fourth radiation part 601, the other end of the sixth radiation part 603 is connected with the end, close to the breaking joint A, of the side frame 102, and a length direction of the sixth radiation part 603 is perpendicular to the length direction of the fourth radiation part 601.

Alternatively or additionally—a user may cause certain interference to an antenna signal to reduce radiation performance of the antenna when the user holds the side frame of the terminal or places the terminal to an ear (the two states are also called head and hand states). In the embodiment of the present disclosure, the two second grounding points are arranged on the circuit board, and one side of the side frame of the terminal is connected with the two second grounding points through the third radiation unit, so that the two second grounding points may effectively shield an interference signal of the user to further reduce a reduction amplitude of the antenna in the head and hand states when the terminal is in the head and hand states; and furthermore, from FIG. 2, it can also be seen that one side of the side frame of the terminal is connected with the third radiation unit while the other side is not connected with any radiation unit of the antenna, so that there is no influence on the radiation performance of the antenna when the user contacts or gets close to the other side of the side frame of the terminal, stability of the radiation performance of the antenna is ensured, and user experiences are improved.

Optionally, as shown in FIG. 3, the first parasitic unit 23 includes a first parasitic part 231 and a second parasitic part 232;

one end of the first parasitic part 231 is connected with the signal feed point 201, the other end of the first parasitic part 231 is connected with the second parasitic part 232, and a length direction of the first parasitic part 231 is perpendicular to the length direction of the bottom frame 101; and the second parasitic part 232 is positioned on the side, far away from the at least two first grounding points 30, of the first parasitic part 231, and a length direction of the second parasitic part 232 is perpendicular to the length direction of the first parasitic part 231.

Optionally, as shown in FIG. 2, a third grounding point 70 is arranged on the circuit board 20; and the second parasitic unit 701 connected with the third grounding point 70 is of a strip-like structure, the second parasitic unit 701 is positioned on the side, far away from the signal feed point 201, of the third grounding point 70, and a length direction of the second parasitic unit 701 is parallel to the length direction of the bottom frame 101.

Alternatively or additionally, two third grounding points and two second parasitic units may also be arranged on the circuit board in another optional embodiment, wherein each third grounding point is connected with a second parasitic unit, and the two second parasitic units may regulate the frequency band of the intermediate-frequency resonance of the antenna.

Optionally, the first radiation unit 202, the second radiation unit 40, the third radiation unit 60, the first parasitic unit 23 and the second parasitic unit 701 are all positioned above a component surface of the circuit board 20 and form gaps with the component surface of the circuit board 20. Herein, the component surface of the circuit board, also called a TOP surface, refers to the surface, on which more components are arranged and which is far away from a display screen of the terminal, of the circuit board. During a practical application, the first to third radiation units, the first parasitic unit and the second parasitic unit may all be printed on the antenna stand, and the antenna stand may be connected with the signal feed point and grounding points on the circuit board, the bottom frame and the side frame through multiple metal elastic pieces. The radiation units and parasitic units of the antenna are mounted overhead the circuit board through the antenna stand, so that more electronic components may be arranged on the circuit board. For example, as shown in FIG. 2, a Universal Serial Bus (USB) interface 801 may be formed between orthographic projections of the second radiation unit 40 and of the second parasitic unit 701 on the circuit board 20, and a loudspeaker 802 may also be arranged on the side, far away from the bottom frame 101, of the orthographic projection of the second parasitic unit 701.

Each of the abovementioned embodiments may be combined according to a condition. For example, two first grounding points, a second grounding point and a third grounding point may be arranged on the circuit board of the antenna, or three first grounding points, two second grounding points and a third grounding point may also be arranged on the circuit board. Any transformed solution apparent to those skilled in the art within the technical scope of the present disclosure shall fall within the scope of protection of the present disclosure, and thus will not be elaborated.

Here, a frequency band to be adopted by the antenna for a terminal may be determined according to an application environment of the terminal and then lengths, thicknesses and intervals of each radiation unit and parasitic unit in the antenna may be regulated to optimize the performance of the antenna in the frequency band to be adopted to further improve the design flexibility of the antenna in the embodiment of the present disclosure.

In the antenna for a terminal according to the embodiment of the disclosure, the signal feed point is arranged on the circuit board of the antenna, and the signal feed point is connected with the bottom frame through the first radiation unit; the at least two first grounding points are also arranged on the circuit board, the at least two first grounding points are positioned on one side of the signal feed point, the at least two first grounding points are connected with the bottom frame through the second radiation unit, and the bottom frame connected with the first radiation unit and the second radiation unit may generate the low-frequency resonance; and moreover, since the second radiation unit is connected with the two first grounding points, the ground wire impedance of the antenna may be reduced, the current in the antenna may dispersively flow into the main grounding point in the circuit board through the at least two first grounding points, the frequency band of the low-frequency resonance of the antenna is further widened, and the performance of the antenna in the frequency band of the low-frequency resonance is improved.

Other embodiments of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

In the antenna for a terminal according to the embodiments of the disclosure, the signal feed point is arranged on the circuit board of the antenna, and the signal feed point is connected with the bottom frame through the first radiation unit; the at least two first grounding points are also arranged on the circuit board, the at least two first grounding points are positioned on one side of the signal feed point, the at least two first grounding points are connected with the bottom frame through the second radiation unit, and the bottom frame is configured to generate the low-frequency resonance. Since the two first grounding points are arranged in the antenna, current in the antenna may dispersively flow into a main grounding point in the circuit board through the at least two first grounding points, the frequency band of the low-frequency resonance of the antenna is thus widened, and performance of the antenna in the frequency band of the low-frequency resonance is improved.

What is claimed is:

1. An antenna, comprising:

a metal frame, a circuit board positioned within the metal frame, at least two radiation units arranged on the circuit board, and at least one second grounding point arranged on the circuit board, wherein the metal frame comprises a bottom frame and a side frame defined by two breaking joints disposed on a side of the metal frame;

wherein a signal feed point is arranged on the circuit board, and the signal feed point is connected with the bottom frame through a first radiation unit; and wherein at least two first grounding points are arranged on the circuit board, the at least two first grounding points are positioned on one side of the signal feed point, the at least two first grounding points are connected with the bottom frame through a second radiation unit, and the bottom frame is configured to generate low-frequency resonance;

wherein the at least one second grounding point is positioned on the other side of the signal feed point, the at least one second grounding point is connected with the side frame through a third radiation unit, and the third radiation unit is configured to generate intermediate-frequency resonance by coupling with the bottom frame.

2. The antenna according to claim 1, further comprising: at least one frequency regulation electronic component arranged on the circuit board, wherein the at least one frequency regulation electronic component is connected in series between the at least two first grounding points and the second radiation unit, and the at least one frequency regulation electronic component is configured to regulate a current between the bottom frame and the at least two first grounding points, wherein the current regulates a frequency band of the low-frequency resonance generated by the bottom frame.

3. The antenna according to claim 1, further comprising: a first parasitic unit, wherein the first parasitic unit is connected with a side, far away from the bottom frame, of the signal feed point, and the first parasitic unit is configured to generate high-frequency resonance.

4. The antenna according to claim 1, further comprising: at least one third grounding point arranged on the circuit board, wherein the at least one third grounding point is positioned on a side, far away from the signal feed point, of the at least two first grounding points, each third grounding point is connected with a second parasitic unit, and the second parasitic unit is configured to regulate a frequency band of the intermediate-frequency resonance.

5. The antenna according to claim 1, wherein two first grounding points are arranged on the circuit board;

the second radiation unit comprises a first radiation part, a second radiation part and a third radiation part, and each of the first to third radiation parts is of a strip-like structure;

one end of the first radiation part is connected with a first grounding point close to the signal feed point, the first radiation part is positioned on a side, far away from the signal feed point, of the first grounding point, and a length direction of the first radiation part is parallel to a length direction of the bottom frame;

one end of the second radiation part is connected with a first grounding point far away from the signal feed point, the other end of the second radiation part is connected with the first radiation part, and a length direction of the second radiation part is perpendicular to the length direction of the first radiation part; and one end of the third radiation part is connected with the first radiation part, the other end of the third radiation part is connected with the bottom frame, and a length direction of the third radiation part is perpendicular to the length direction of the first radiation part.

6. The antenna according to claim 1, wherein two second grounding points are arranged on the circuit board; and a second grounding point, close to the signal feed point, of the two second grounding points and a first grounding point close to the signal feed point are symmetrically arranged with the signal feed point being a center point.

7. The antenna according to claim 6, wherein the third radiation unit comprises a fourth radiation part, a fifth radiation part and a sixth radiation part, and each of the fourth to sixth radiation parts is of a strip-like structure;

one end of the fourth radiation part is connected with the second grounding point close to the signal feed point, the fourth radiation part is positioned on a side, far away from the signal feed point, of the second grounding point, and a length direction of the fourth radiation part is parallel to a length direction of the bottom frame;

one end of the fifth radiation part is connected with a second grounding point far away from the signal feed point, the other end of the fifth radiation part is connected with the fourth radiation part, and a length direction of the fifth radiation part is perpendicular to the length direction of the fourth radiation part; and one end of the sixth radiation part is connected with the fourth radiation part, the other end of the sixth radiation part is connected with one end, close to one of the breaking joints, of the side frame, and a length direction of the sixth radiation part is perpendicular to the length direction of the fourth radiation part.

8. The antenna according to claim 3, wherein the first parasitic unit comprises a first parasitic part and a second parasitic part;

one end of the first parasitic part is connected with the signal feed point, the other end of the first parasitic part is connected with the second parasitic part, and a length direction of the first parasitic part is perpendicular to a length direction of the bottom frame; and the second parasitic part is positioned on a side, far away from the at least two first grounding points, of the first parasitic part, and a length direction of the second parasitic part is perpendicular to the length direction of the first parasitic part.

9. The antenna according to claim 4, wherein one third grounding point is arranged on the circuit board; and a second parasitic unit connected with said one third grounding point is of a strip-like structure, the second parasitic unit is positioned on a side, far away from the signal feed point, of said one third grounding point, and a length direction of the second parasitic unit is parallel to a length direction of the bottom frame.

10. The antenna according to claim 1, wherein the at least two radiation units are positioned above a component surface of the circuit board and there is a gap between the two radiation units and the component surface.

11. The antenna according to claim 2, wherein the frequency regulation electronic component comprises any one of a resistor, an inductor and a capacitor.

12. The antenna according to claim 1, wherein a frequency band of the low-frequency resonance is 700 MHz to 960 MHz; and a frequency band of the intermediate-frequency resonance is 1,710 MHz to 2,170 MHz.

13. The antenna according to claim 3, wherein a frequency band of the high-frequency resonance is 2,300 MHz to 2,700 MHz.

14. An electronic device, comprising:

an antenna comprising a metal frame surrounding the electronic device, a circuit board positioned within the metal frame, at least two radiation units arranged on the circuit board, and at least one second grounding point arranged on the circuit board, wherein the metal frame comprises a bottom frame and a side frame defined by two breaking joints disposed on a side of the metal frame;

wherein a signal feed point is arranged on the circuit board, and the signal feed point is connected with the bottom frame through a first radiation unit;

wherein at least two first grounding points are arranged on the circuit board, the at least two first grounding points are positioned on one side of the signal feed point, the at least two first grounding points are connected with the bottom frame through a second radiation unit, and the bottom frame is configured to generate low-frequency resonance; and wherein the at least one second grounding point is positioned on the other side of the signal feed point, the at least one second grounding point is connected with the side frame through a third radiation unit, and the third radiation unit is configured to generate intermediate-frequency resonance by coupling with the bottom frame.

15. The electronic device according to claim 14, further comprising:

at least one frequency regulation electronic component arranged on the circuit board, wherein the at least one frequency regulation electronic component is connected in series between the at least two first grounding points and the second radiation unit, and the at least one frequency regulation electronic component is configured to regulate a current between the bottom frame and the at least two first grounding points, wherein the current regulates a frequency band of the low-frequency resonance generated by the bottom frame.

16. The electronic device according to claim 14, further comprising:

a first parasitic unit, wherein the first parasitic unit is connected with a side, far away from the bottom frame, of the signal feed point, and the first parasitic unit is configured to generate high-frequency resonance.

17. The electronic device according to claim 14, further comprising:

at least one third grounding point arranged on the circuit board, wherein the at least one third grounding point is positioned on a side, far away from the signal feed point, of the at least two first grounding points, each third grounding point is connected with a second parasitic unit, and the second parasitic unit is configured to regulate a frequency band of the intermediate-frequency resonance.

18. The electronic device according to claim 14, wherein two first grounding points are arranged on the circuit board;

the second radiation unit comprises a first radiation part, a second radiation part and a third radiation part, and each of the first to third radiation parts is of a strip-like structure;

one end of the first radiation part is connected with a first grounding point close to the signal feed point, the first radiation part is positioned on a side, far away from the signal feed point, of the first grounding point, and a length direction of the first radiation part is parallel to a length direction of the bottom frame;

one end of the second radiation part is connected with a first grounding point far away from the signal feed point, the other end of the second radiation part is connected with the first radiation part, and a length direction of the second radiation part is perpendicular to the length direction of the first radiation part; and one end of the third radiation part is connected with the first radiation part, the other end of the third radiation part is connected with the bottom frame, and a length direction of the third radiation part is perpendicular to the length direction of the first radiation part.

* * * * *